Aug. 12, 1941. A. D. EITZEN Re. 21,872
TAPE REGULATING DEVICE FOR STOCK QUOTATION PROJECTORS
Original Filed April 23, 1929 2 Sheets-Sheet 1
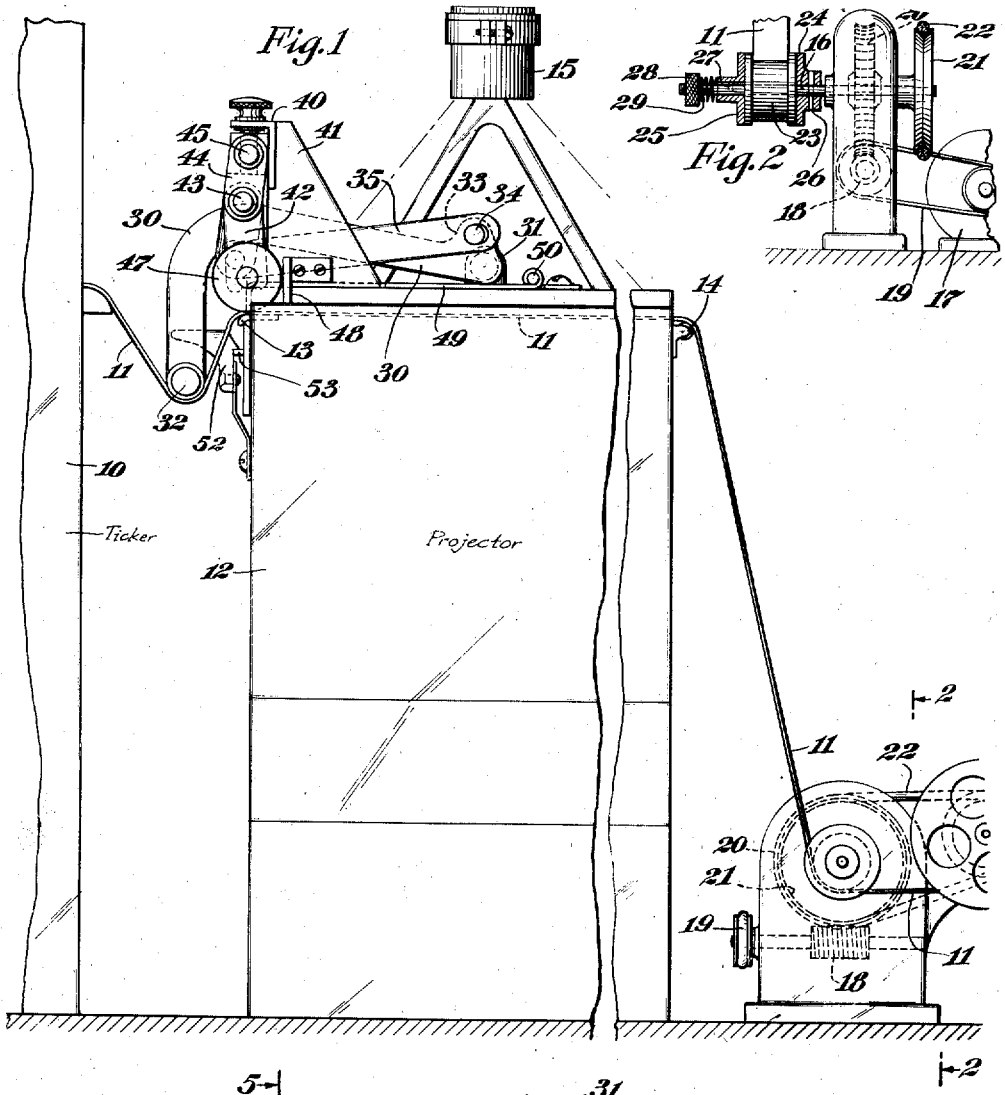
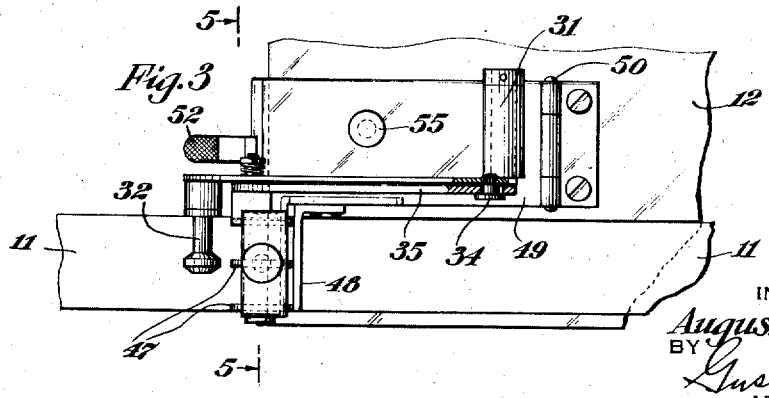
INVENTOR
August D. Eitzen,
BY Gustav Drews
ATTORNEY TAPE REGULATING DEVICE FOR STOCK QUOTATION PROJECTORS
Original Filed April 23, 1929 2 Sheets-Sheet 2
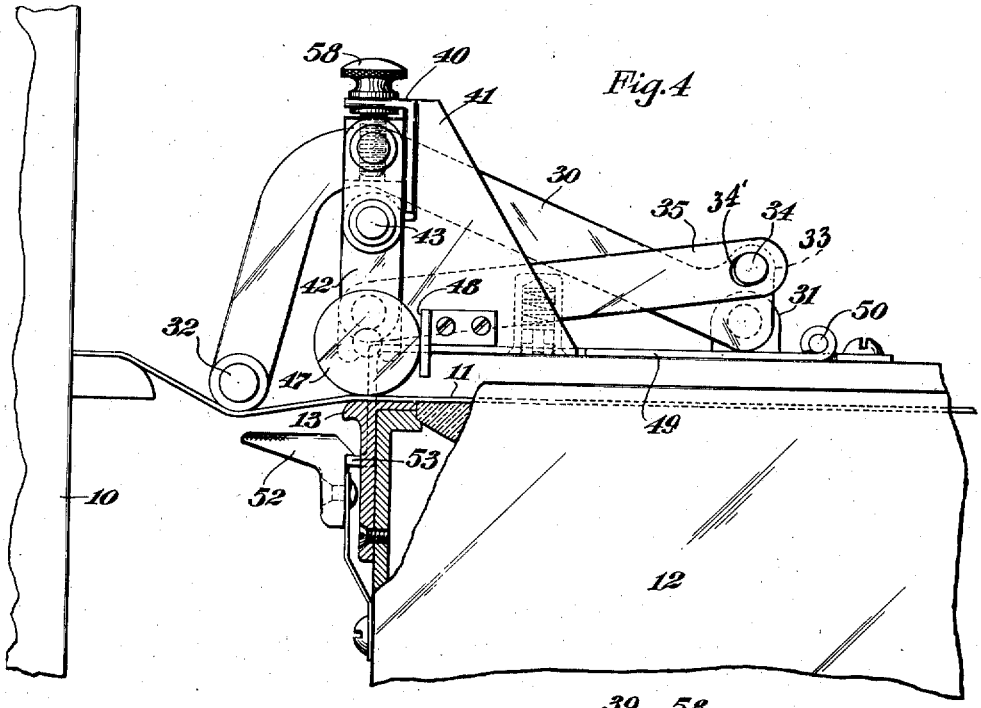
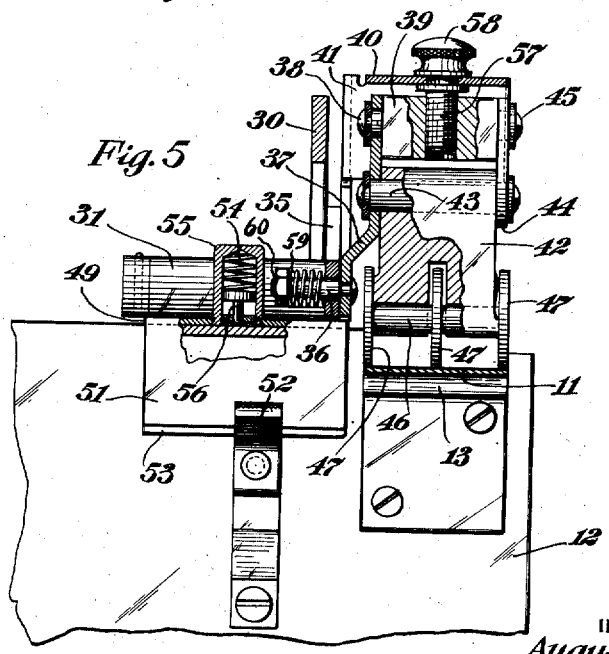
INVENTOR
August D. Eitzen,
BY Gustav Drews
ATTORNEY Reissued Aug. 12, 1941 Re. 21,872

UNITED STATES PATENT OFFICE 21,872

TAPE REGULATING DEVICE FOR STOCK QUOTATION PROJECTORS

August D. Eitzen, Rockville Centre, N. Y., assignor to News Projection Corporation, New York, N. Y., a corporation of New York Original No. 1,822,769, dated September 8, 1931, Serial No. 357,448, April 23, 1929. Application for reissue September 26, 1934, Serial No. 745,600

18 Claims. (Cl. 88—24)

My present invention relates generally to stock ticker projecting machines, and has particular reference to an improved apparatus for tensioning the tape as the latter passes through a projecting machine.

In a machine of the character to which my invention has particular reference, a stock quotation ticker is adapted to discharge marked tape and to operate periodically or intermittently. That is, the stock ticker will cease functioning entirely at certain intervals in accordance with well known practice. Coupled with the foregoing is a projecting device through which the marked tape is guided so that the markings thereon may be suitably cast upon a display screen or screens. A rewinding mechanism serves to exert a continuous pull upon the tape as the latter leaves the projecting device, the operation of the rewinding mechanism serving to draw the tape from the ticker through the projecting device.

My present invention is predicated upon a rewinding mechanism which is continuously operating, and more particularly, one wherein a motor or the like runs continuously regardless of the operation of the ticker itself. This continuous operation of the rewinding mechanism, coupled with the intermittent operation of the ticker as pointed out above, necessitates the provision of a slippage arrangement which permits the rewinding mechanism to continue functioning without tearing the tape.

One of the objects of my present invention is to provide an improved type of slippage device, simple in structural nature, inexpensive to manufacture and install, and reliable in operation.

It is also desirable that the pull exerted upon the tape by the rewinding mechanism be not transmitted all the way back to the stock ticker, because the latter should, if possible, operate in an unimpeded and unhurried manner independent of any subsequent treatment or pulling of the tape discharged thereby. One object of my invention is to provide an apparatus for effecting this result.

Quite apart from the desirability, as pointed out above, of avoiding any direct pull upon the tape as it leaves the stock ticker, it is highly advantageous to tension the tape as the latter passes through the projecting device, and to exert this tension in such a manner that the minute fluctuations caused by the operation of the ticker will be eradicated. Such fluctuations, if not avoided, would be highly magnified by the projecting device and would cause the reading of the display screen to be somewhat impaired. It is particularly desirable that the tape be held taut in the projecting device during those periods in which it is entirely stationary, viz., those periods during which the stock ticker has ceased to discharge further tape.

A particular object of my invention is to provide a tensioning apparatus which will function in a simple yet reliable manner for accomplishing the results illustratively set forth above.

One of the main features of my invention lies in the provision of an apparatus wherein a roller and an abutment are so positioned that the tape passes therebetween upon entering the projecting device; and in the provision of means for positively causing the roller and abutment to be forced together or to be separated at predetermined times. More particularly, the apparatus which I provide efficiently and automatically forces the roller and abutment to clamp the tape therebetween at those times when the stock ticker has ceased to discharge tape, and similarly, effects a separation of these two elements as soon as movement of the tape is again to be resumed.

In accordance with my invention I provide means for braking the roller against rotation when it is brought into engagement with the abutment to clamp the tape. I have found that in this way I can more easily effect a firmer engagement of the tape at the desired times.

Another feature of my invention lies in the employment of a pair of toggle members for accomplishing the desired relative adjustments of the roller and abutment, the action of such members having been found by me to be peculiarly efficient and satisfactory in connection with the tape engagement.

A general object of my invention is to provide a construction which is fundamentally simple, which functions in a positive manner, and which is easily installed and maintained in operation.

For the attainment of the foregoing objects and such other objects as may hereinafter appear or be pointed out, I have constructed a device embodying the features of my invention and illustrated in the accompanying drawings wherein—

Figure 1 is an elevational view, partly diagrammatic, showing a projecting machine embodying the features of my present invention;

Figure 2 is a cross-sectional view taken substantially along the line 2—2 of Figure 1, illustrating the features of my slippage arrangement;

Figure 3 is a plan view of the apparatus arranged on the projecting device of Figure 1;

Figure 4 is a view similar to Figure 1 on an enlarged scale, showing the tensioning apparatus during one phase of operation; and Figure 5 is a cross-sectional elevation on an enlarged scale, taken substantially along the line 5—5 of Figure 3.

I have shown one side of a stock ticker 10 with a marked tape 11 being discharged therefrom. This tape is guided through a projecting device 12 and I have illustratively shown the same passing over an abutment or bed plate 13 as it enters the device 12 and passing over a roller or the like 14 upon leaving the device 12. A source of light and other apparatus within the projecting device 12, and not illustrated herein, projects a beam of light upwardly through the tape and through a suitable objective 15.

A continuously operating motor 17 drives a worm 18 by means of a belt or the like 19, the worm 18 meshing with a worm wheel 20 mounted upon the shaft 16. A pulley or sheave 21 mounted upon the rear end of the shaft 16 serves to drive a suitable mandrel or the like, by means of a thong or belt 22 which is of the slip belt or spring belt type. Upon this mandrel, the tape may be wound into a spiral mass.

Loosely mounted upon the shaft 16 is a tape-engaging pulley 23, and in accordance with my present invention I provide means for yieldably locking the pulley 23 to the shaft 16 so that normally this pulley will rotate with the shaft but when the tape exerts a rearward pull the pulley 23 is permitted to remain stationary while the shaft 16 continues to rotate.

One feature of my invention resides in the particular yieldable locking means herein provided consisting in a pair of friction discs 24 and 25 mounted upon the shaft 16 on opposite sides of the pulley 23 and sandwiching the pulley therebetween. The disc 24 is rigidly keyed as at 26 to the shaft 16 and is immovable axially along the latter. The disc 25 is splined as at 27 to the shaft 16 so that it rotates with the shaft but is axially shiftable. A collar 28 is fixed to the end of the shaft and a spring 29 constantly urges the disc 25 toward the opposite disc 24, thereby frictionally engaging the pulley 23 and causing the latter to rotate and draw the tape 11.

Under normal conditions, it will thus be seen that the tape 11 is smoothly and efficiently drawn through the projecting device and rewound into a spiral form. Should the stock ticker cease to operate, the apparatus presently to be described functions to engage the tape at its point of entrance into the projecting device, and the continued rotation of the shaft 16 thereupon exerts a sustained pull upon the tape 11, this pull being insufficient to cause any damage to the tape by virtue of the slippage of the pulley 23. The degree of tension upon the tape during such periods of slippage may be controlled by adjusting the spring 29, and for this purpose I have shown the collar 28 in the form of a knurled nut axially adjustable on the shaft 16. The adjustment of the nut 28 enables me to control the slippage arrangement to a very fine degree whereby smooth and unimpaired operation may be achieved.

One of the main objects of my invention is to provide a means for tensioning the tape between the abutment 13 and the roller 14, both during its movement through the projecting device and during those periods in which it is at rest. The apparatus which I shall now describe accomplishes this tensioning in such a manner that during movement of the tape the pull of the rewinding mechanism on the one side and the operation of the tensioning device on the other side of the projecting device serves to produce a smooth and unfluctuating display upon the screen or screens. At the same time, during periods of absolute stoppage, the tensioning device operates to engage the tape firmly at its point of entrance to the projecting device whereby the continued pull exerted by the rewinding mechanism maintains the necessary and desired tension.

I have provided a bell-crank lever 30 pivoted to the projecting device as at 31. The arm which I have termed the forward arm of this bell-crank lever is angularly configured and is provided with a finger 32 which bears downwardly, by its own weight, upon the tape 11 approaching the projecting device. The opposite or rear arm 33 of the lever 30 is provided with a pin 34 which engages within a slightly elliptical slot 34′ at the rear end of a link 35. The forward end of the link 35 is pivoted as at 36 (see Figure 5) to the lower end of a toggle member 37. The upper end of the member 37 is pivoted as at 38 to a block 39 supported by the top plate 40 of a bracket 41.

At a midportion of the toggle member 37 I articulate a second and cooperative toggle member 42. I have shown a spindle 43 extending between the toggle member 37 and an auxiliary element 44, the latter being pivotally connected as at 45 to the block 39. The upper end of the toggle member 42 is mounted pivotally on the spindle 43, and the lower end of the member 42 is forked and accommodates the roller 46.

In the illustrated embodiment I have shown the roller provided with three spaced ridges 47. These ridges are adapted to cooperate with the abutment 13 to clamp the tape 11 therebetween, and I find it advantageous to provide such ridges for the reason that the markings on the tape are thereby left uncontacted.

Under normal conditions, the forward arm of the lever 30 bears gravitationally upon the tape 11 as the latter approaches the projecting device. This forces the link 35 to the left (as viewed in Figures 1 and 4), the toggle member 37 being thereby swung in a clockwise direction about the pivots 38 and 45. This in turn serves to raise the roller 46 by a slight degree, thereby separating the roller 46 from the abutment 13 and permitting the tape to pass freely between them. When the ticker 10 ceases to operate, the pull by the rewinding mechanism starts to effect a slack take-up, and cause the arm of the lever 30 to rise. This swings the rear arm 33 in a clockwise direction and ultimately forces the link 35 to the right. As a result of this, the toggle member 37 is swung in a counter-clockwise direction and the toggle members are thereby forced into alignment. Obviously, this forces the roller 46 downwardly so that it bears against the tape 11 and clamps the latter to the bed plate or abutment 13. This clamping engagement is shown in Figure 4, the parts having been swung in the manner described. As soon as the ticker 10 starts again to discharge tape, the lever 30 is permitted to drop and promptly thereafter effects a release of the tape.

It is to be noted that the operation of the lever 30 in accomplishing an engagement and release of the tape fulfills this function in a positive manner; and this fact, coupled with the efficient operation of the toggle members above described, results in the provision of a compact apparatus which is extremely simple and reliable. The toggle members 37 and 42 may be accurately adjusted for the purpose of engaging the tape with exactly the proper degree of firmness desired, by means of the mounting for the block 39. In Figure 5 it will be noted that a stud 57 extends downwardly into a suitable internally threaded bore in the block 39. By manually rotating the knob 58 carried by the stud 57 and projecting above the top wall 40, the block 39 may be accurately adjusted upwardly or downwardly to the proper degree so that the operation of the toggle members may be controlled accordingly. The amount of contact of the ridges 47 normally when the ticker is operating is also conveniently controlled by the stud 57. It is of course understood that it is desirable that a certain amount of contact be maintained at all times with the tape 11 to dissipate the minute fluctuations transmitted to the tape by the operation of the ticker.

The efficiency with which the tape is gripped or engaged is increased, in the present instance, by the provision of means for braking the roller 46 against rotation when it is depressed against the tape 11 on the abutment 13. In providing this braking means I take advantage again of the peculiar and characteristic action of the toggle members. I provide a braking plate 48 arranged in a substantially vertical plane and closely adjacent to the peripheries of the ridges 47. This plate may be attached to the bracket 41 and is so positioned that the roller 46 will encounter the same during its movement toward the abutment 13. Thus, in Figure 4, the ridges 47 are shown in firm engagement with not only the tape 11 on the abutment 13 but also the braking plate 48, this engagement serving to hold the roller 46 against any rotation which the tape may be tending to induce. It is to be noted that this advantageous result is accomplished in an extremely simple manner, relying primarily upon the jamming of the roller against the tape 11 on the abutment 13 and the plate 48, and it is to be particularly noted that this jamming is of a character which is at once released as soon as the roller 46 is allowed to move by even the slightest degree out of the engagement position of Figure 4.

For the purpose of increasing the simplicity with which my apparatus may be installed and maintained in operation, I mount the same not directly upon the projecting device 12 but upon a plate 49 or the like hinged as at 50 to the top wall of the projecting device. I have found it of particular advantage to construct the plate 49 as a cover for an opening through which the tape may be accessible for threading purposes. The plate or cover 49 has an end portion 51 which extends downwardly along the side of the projecting device, and a latch 52 serves to engage a projection 53 for holding the cover closed. When the latch 52 is manipulated, as by pressing thereon, a spring 54 mounted in a housing 55 operates upon a small plunger 56 to initiate the upward movement of the plate 49 and the entire apparatus carried thereby. This includes all the apparatus above described, since it is to be noted that the bracket 41 and the hinge 31 are mounted upon the plate 49. The spring 54 serves greatly to facilitate the lifting of the cover 49 after the latch 52 has been depressed.

The slot 34' cooperates with the pin 34 to form a lag at the beginning of the operation of the ticker which will be sufficient to permit the formation of a loop beneath the finger 32 of sufficient extent to insure the smooth movement of the tape, at any rate sufficient to prevent the unlocking action of the link 35 upon each advance of the tape by the ticker. In other words, the pin 34 and slot 34' cooperate to permit the release of the link 35 to overlap the period required to advance the tape several characters, preferably about four characters.

As more clearly shown in Fig. 5, a spring 59 is mounted on the pivot pin 36 which is tensed between the nut 60 and the outer face of the link 35 to frictionally engage the free face of the link 35 with the adjacent face of the toggle member 37. As a result thereof, the lag aforesaid is further facilitated in that the initial movement of the lever 30 and the consequent movement of the pin 34 in the slot 34' upon the start of a ticker will not be sufficient to overcome the frictional engagement of the link 35 and the toggle member 37 induced by the spring 59 to cause the toggle member 37 to be actuated to break the locking action of the roller 46 against the tape 11 until the lag afforded by the slot 34' has been taken up and in turn the initial movement of the lever 30 and the consequent movement of the pin 34 in the slot 34' upon the arrest of the ticker will not be sufficient to overcome the frictional engagement of the link 35 and the toggle member 37 induced by the spring 59 to cause the toggle member 37 to be actuated to effect the locking action of the roller 46 against the tape 11 until the lag afforded by the slot 34' has been taken up.

It will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative and not in a limiting sense.

Having thus described my invention and illustrated its use, what I claim as new and desire to secure by Letters Patent is—

1. In a stock ticker projection machine, the combination with an intermittently operating ticker adapted to discharge marked tape, a projecting device, and a continuously operating mechanism for drawing the tape through said projecting device; a tape-tensioning apparatus comprising a lever pivoted to said projecting device and provided with a head adapted gravitationally to bear on the tape approaching the projecting device, whereby slack take-up caused by stoppage of the ticker will raise said lever, a roller and an abutment between which the tape passes on entering the projecting device, and means operated by said lever when the latter rises and falls for respectively forcing together and separating said roller and abutment.

2. In a stock ticker projection machine, the combination with an intermittently operating ticker adapted to discharge marked tape, a projecting device, and a continuously operating mechanism for drawing the tape through said projecting device; a tape-tensioning apparatus comprising a lever pivoted to said projecting device and provided with a head adapted gravitationally to bear on the tape approaching the projecting device, whereby slack take-up caused by stoppage of the ticker will raise said lever, a roller and an abutment between which the tape passes on entering the projecting device, and means operated by said lever when the latter rises and falls for respectively forcing together and separating said roller and abutment; said means including a pair of toggle members operatively associated with said lever.

3. In a stock ticker projection machine, the combination with an intermittently operating ticker adapted to discharge marked tape, a projecting device, and a continuously operating mechanism for drawing the tape through said projecting device; a tape-tensioning apparatus comprising a lever pivoted to said projecting device and provided with a head adapted gravitationally to bear on the tape approaching the projecting device, whereby slack take-up caused by stoppage of the ticker will raise said lever, a roller and an abutment between which the tape passes on entering the projecting device, and means including a pair of toggle members for forcing said roller and abutment together when the lever rises and separating them when the lever falls; said means comprising a link pivoted at one end to said lever and at the other end to said toggle members.

4. In a stock ticker projection machine, the combination with an intermittently operating ticker adapted to discharge marked tape, a projecting device, and a continuously operating mechanism for drawing the tape through said projecting device; a tape-tensioning apparatus comprising a bell-crank lever pivoted to said projecting device and having its forward arm provided with a head which gravitationally bears on the tape approaching the projecting device, whereby slack take-up will raise said arm and pivot said lever, a roller and an abutment between which the tape passes on entering said projecting device, and means operated by the rear arm of said lever when the latter pivots as aforesaid for forcing said roller and abutment together to clamp the tape.

5. In a stock ticker projection machine, the combination with an intermittently operating ticker adapted to discharge marked tape, a projecting device, and a continuously operating mechanism for drawing the tape through said projecting device; a tape-tensioning apparatus comprising a bell-crank lever pivoted to said projecting device and having its forward arm provided with a head which gravitationally bears on the tape approaching the projecting device, whereby slack take-up will raise said arm and pivot said lever, a roller and an abutment between which the tape passes on entering said projecting device, and means operated by the rear arm of said lever when the latter pivots as aforesaid for forcing said roller and abutment together to clamp the tape; said means comprising a pair of toggle members one of which carries said roller, and a link pivoted at one end to said rear arm and at the other end to said toggle members.

6. In a stock ticker projection machine, the combination with an intermittently operating ticker adapted to discharge marked tape, a projecting device, and a continuously operating mechanism for drawing the tape through said projecting device; a tape-tensioning apparatus comprising a lever pivoted to said projecting device and provided with a head adapted gravitationally to bear on the tape approaching the projecting device, whereby slack take-up caused by stoppage of the ticker will raise said lever, a roller and an abutment between which the tape passes on entering the projecting device, means operated by said lever when the latter rises and falls for forcing together and separating said roller and abutment, and means for braking said roller against rotation when it is forced against the abutment.

7. In a stock ticker projection machine, the combination with an intermittently operating ticker adapted to discharge marked tape, a projecting device, and a continuously operating mechanism for drawing the tape through said projecting device; a tape-tensioning apparatus comprising a lever pivoted to said projecting device and provided with a head adapted gravitationally to bear on the tape approaching the projecting device, whereby slack take-up caused by stoppage of the ticker will raise said lever, a roller and an abutment between which the tape passes on entering the projecting device, means operated by said lever when the latter rises and falls for forcing together and separating said roller and abutment, and means for braking said roller against rotation when it is forced against the abutment; said last-named means comprising a brake plate so positioned that the roller will bear thereagainst when forced toward the abutment.

8. In a stock ticker projection machine, the combination with an intermittently operating ticker adapted to discharge marked tape, a projecting device, a continuously operating mechanism for drawing the tape through said projecting device, and an abutment over which the tape passes in entering said projecting device; a tape-tensioning apparatus comprising an angular lever pivoted to said projecting device and having a head adapted gravitationally to bear on the tape approaching the projecting device, whereby slack take-up caused by stoppage of the ticker will raise said lever, a roller adjustably positioned over said abutment, and means positively operated by said lever when the latter rises for depressing said roller onto said abutment to clamp the tape.

9. In a device of the character described, the combination with a ticker, of a tape puller, a projecting machine, a device for anchoring the tape against movement by said tape puller when the ticker comes to rest, said anchoring device consisting of a lever engaging the tape between the ticker and said projecting machine, a friction creating element for cooperating with the tape, means cooperating with said lever and friction creating element to cause said friction creating element to lock said tape against movement when the tape actuates said lever upon the arrest of the ticker, and means for causing a dwell to take place between the initial start of the ticker and the actuation of said friction creating element.

10. In a stock ticker projection machine, the combination with an intermittently operating ticker adapted to discharge marked tape, a projecting device, and a continuously operating rewinding mechanism for drawing the tape through said projecting device; a tape-tensioning apparatus comprising a lever pivoted to said projecting device and provided with a head adapted gravitationally to bear on the tape approaching the projecting device, whereby slack take-up caused by stoppage of the ticker will raise said lever, a roller and an abutment between which the tape passes on entering the projecting device, means operated by said lever when the latter rises and falls for respectively forcing together and separating said roller and abutment, said rewinding mechanism comprising a continuously rotating shaft, a tape engaging pulley rotatably mounted on said shaft, and means for releasably locking said pulley to said shaft when said roller and abutment clamp said tape against movement.

11. In a stock ticker projection machine, the combination with an intermittently operating ticker adapted to discharge marked tape, a projecting device, and a continuously operating rewinding mechanism for drawing the tape through said projecting device; a tape-tensioning apparatus comprising a lever pivoted to said projecting device and provided with a head adapted gravitationally to bear on the tape approaching the projecting device, whereby slack take-up caused by stoppage of the ticker will raise said lever, a roller and an abutment between which the tape passes on entering the projecting device, means operated by said lever when the latter rises and falls for respectively forcing together and separating said roller and abutment, said rewinding mechanism including a reel on which the tape is received, actuating means, and a slip clutch including said reel with said actuating means whereby the reel will remain stationary when the tape is locked against movement by said roller and abutment.

12. The combination with a ticker, of a continuously operating motor, a tape puller for advancing the tape as it is discharged from the ticker, a tape retarding device disposed between the ticker and the tape puller, a finger responsive to a deflection of the tape, actuating means for causing actuation of said device into and out of tape retarding position for imparting a retarding effect on the tape sufficient to cause said tape puller to cease advancing the tape, and means for operatively connecting said finger to cause actuation of said actuating means whereby decrease in deflection of the tape upon the arrest of the ticker will actuate said finger in turn to cause actuation of said actuating means, to cause actuation of said device, to engage the tape and retard its advance, and whereby increase of deflection of the tape upon the resumed operation of the ticker will actuate said finger in turn to cause actuation of said device out of tape retarding position, to release the tape and permit the tape puller under the influence of said motor to resume the advancement of the tape.

13. The combination with a ticker, of a continuously operating motor, a tape puller for advancing the tape as it is discharged from the ticker, an abutment between the ticker and tape puller, a tape retarding member for pressing the tape into frictional engagement with said abutment to retard the advance of the tape when the ticker has come to rest, a finger responsive to a deflection of the tape, actuating means for causing actuation of said member into and out of tape retarding position for imparting a retarding effect on the tape sufficient to cause said tape puller to cease advancing the tape, and means for operatively connecting said finger to cause actuation of said actuating means whereby decrease in deflection of the tape upon the arrest of the ticker will actuate said finger in turn to cause actuation of said member to press the tape against said abutment and retard its advance, and whereby increase of deflection of the tape upon the resumed operation of the ticker will actuate said finger in turn to cause actuation of said member out of tape retarding position to release the tape and permit the tape puller under the influence of said motor to resume the advancement of the tape.

14. The combination with a ticker, of a continuously operating motor, a tape puller for advancing the tape as it is discharged from the ticker, a slip clutch for operatively connecting said tape puller to be driven by said motor, a tape retarding device disposed between the ticker and the tape puller, a finger responsive to a deflection of the tape, actuating means for causing actuation of said device into and out of tape retarding position for imparting a retarding effect on the tape sufficient to cause said slip clutch to slip and in turn to cause said tape puller to cease advancing the tape, and means for operatively connecting said finger to cause actuation of said actuating means whereby decrease in deflection of the tape upon the arrest of the ticker will actuate said finger in turn to cause actuation of said actuating means, to cause actuation of said device, to engage the tape, to retard its advance sufficiently to cause said slip clutch to slip and whereby increase of deflection of the tape upon the resumed operation of the ticker will actuate said finger in turn to cause actuation of said device out of tape retarding position, to release the tape and permit the slip clutch again to connect the tape puller to said motor to resume the advancement of the tape.

15. The combination as set forth in claim 14 characterized by having means for regulating the slip clutch to adjust the slippage sensitiveness with respect to the retarding effect of the tape retarding device.

16. In combination, a tape printing apparatus adapted to eject tape therefrom, a support, means for feeding tape across said support, gripping means intermediate said printing apparatus and tape feeding means, said gripping means being movable away from the tape to permit free movement thereof over said support and being movable against the tape to stop the motion thereof across the support, when there is a predetermined minimum length of tape between said printing apparatus and support, and means for maintaining said gripping means in engagement with the tape until a length of tape, corresponding to a predetermined plural number of characters, has been ejected by said printing apparatus.

17. In combination, a tape supply, a support, a tape puller for moving said tape across said support, means for forming a loop of tape between said tape supply and support, a tape engaging device adapted to move into position to grip the tape, to arrest its movement when said loop decreases to a predetermined minimum size and to move into position to release the tape when the loop increases to a predetermined larger size and means for locking the tape engaging device in one or the other of said positions when the loop is of an intermediate size.

18. In combination, a telegraph printing apparatus adapted to eject tape therefrom, a support, a tape puller for moving said tape across said support, means for forming a loop of tape between said printing apparatus and support, an arm riding in said loop and having upper and lower limits of movement, corresponding to a difference in the length of the loop of several characters, a tape gripping device movable into engagement with the tape to arrest its movement when the arm is in its upper limit and means for maintaining said gripping device in engagement with the tape to hold the tape at rest until said arm reaches its lower limit of movement.

AUGUST D. EITZEN.